United States Patent
Johnson

(10) Patent No.: US 9,112,939 B2
(45) Date of Patent: Aug. 18, 2015

(54) CLOUD-BASED VIDEO DELIVERY

(71) Applicant: Unicorn Media, Inc., Tempe, AZ (US)

(72) Inventor: Matthew A. Johnson, Tempe, AZ (US)

(73) Assignee: Brightcove, Inc., Boston, MA (US)

( * ) Notice: Subject to any disclaimer, the term of this patent is extended or adjusted under 35 U.S.C. 154(b) by 0 days.

(21) Appl. No.: 13/765,195

(22) Filed: Feb. 12, 2013

(65) Prior Publication Data

US 2014/0229579 A1    Aug. 14, 2014

(51) Int. Cl.
*G06F 15/16* (2006.01)
*H04L 29/06* (2006.01)
*H04N 21/2343* (2011.01)
*H04N 21/6583* (2011.01)
*G06F 17/30* (2006.01)

(52) U.S. Cl.
CPC .......... *H04L 65/60* (2013.01); *G06F 17/30781* (2013.01); *G06F 17/30855* (2013.01); *H04N 21/23439* (2013.01); *H04N 21/6583* (2013.01)

(58) Field of Classification Search
CPC . H04L 65/60; H04L 12/5855; H04L 12/5895; H04L 41/5025; H04L 43/16; H04W 52/02; H04N 21/24; H04N 21/262
USPC ....................................... 709/231; 725/32, 95
See application file for complete search history.

(56) References Cited

U.S. PATENT DOCUMENTS

| | | | |
|---|---|---|---|
| 6,510,177 B1 * | 1/2003 | De Bonet et al. ........ | 375/240.16 |
| 7,769,416 B2 * | 8/2010 | Wei et al. ....................... | 455/574 |
| 2002/0198936 A1 * | 12/2002 | McIntyre et al. ............. | 709/203 |
| 2004/0128386 A1 * | 7/2004 | Oomoto et al. ............... | 709/226 |
| 2005/0209927 A1 | 9/2005 | Aaltonen et al. | |
| 2005/0233728 A1 * | 10/2005 | Karaoguz et al. ............. | 455/406 |
| 2008/0091845 A1 | 4/2008 | Mills | |
| 2008/0195698 A1 * | 8/2008 | Stefanovic et al. ........... | 709/203 |
| 2008/0235379 A1 * | 9/2008 | Monette ........................ | 709/226 |
| 2010/0260192 A1 * | 10/2010 | Hiie et al. ..................... | 370/400 |
| 2010/0312905 A1 * | 12/2010 | Sandmann et al. ........... | 709/231 |
| 2010/0318672 A1 | 12/2010 | Bouazizi | |
| 2011/0029883 A1 * | 2/2011 | Lussier et al. ................ | 715/738 |
| 2011/0252082 A1 * | 10/2011 | Cobb et al. ................... | 709/203 |
| 2011/0312307 A1 * | 12/2011 | Gross et al. ................ | 455/414.1 |
| 2012/0030376 A1 * | 2/2012 | Lemus et al. ................. | 709/246 |
| 2012/0117632 A1 * | 5/2012 | Curtis et al. ...................... | 726/7 |
| 2012/0163203 A1 * | 6/2012 | Wilkinson et al. ............ | 370/252 |
| 2012/0240167 A1 * | 9/2012 | Vasudevan et al. ............ | 725/62 |
| 2013/0124242 A1 * | 5/2013 | Burke et al. ................. | 705/7.12 |
| 2013/0268961 A1 * | 10/2013 | Miles et al. ..................... | 725/32 |
| 2013/0283143 A1 * | 10/2013 | Petajan et al. ................ | 715/230 |

OTHER PUBLICATIONS

DVB Organization: "TM-IPI-2552r12-CDS-Specification_clean.doc", DVB, Digital Video Broadcasting, c/o EBU-17A Ancienne Route—CH-1218 Grand Saconnex, Geneva—Switzerland, Sep. 11, 2008, XP017811009, sections 3.1-3.2, section 4; p. 20, section 4.2.2.2, section 4.2.4, section 5.2.5.
International Search Report and Written Opinion for PCT/US2014/0013724 mailed May 27, 2014, 13 pages.

* cited by examiner

*Primary Examiner* — Thuong Nguyen
(74) *Attorney, Agent, or Firm* — Kilpatrick Townsend & Stockton LLP

(57) ABSTRACT

Techniques described herein provide for cloud-based media delivery that accepts or ingests media content, transcodes it according to various media profiles to create a plurality of video files, and provides notification that at least a portion of the video files is ready for delivery. The notification can be provided using a notification Unique Resource Locator (URL), which can be provided in a request to prepare the media content for delivery. Business rules can be used to customize the cloud-based media delivery based on any of a variety of factors, such as requesting party, media type, and the like.

20 Claims, 6 Drawing Sheets

CLOUD-BASED VIDEO DELIVERY

BACKGROUND OF THE INVENTION

The delivery of media over data networks such as the Internet is in high demand. The requirements to meet this demand are compounded by the vast array of media devices (mobile phones, tablets, personal computers, televisions, video game consoles, etc.) capable of playing media and the bandwidth of each, which can vary based on network conditions. As such, it can be difficult for a media provider to transcode and publish media in the variety of formats capable of accommodating the needs of the various media devices.

BRIEF SUMMARY OF THE INVENTION

Techniques described herein provide for cloud-based media delivery that accepts or ingests media content, transcodes it according to various media profiles to create a plurality of video files, and provides notification that at least a portion of the video files is ready for delivery. The notification can be provided using a notification Unique Resource Locator (URL), which can be provided in a request to prepare the media content for delivery. Business rules can be used to customize the cloud-based media delivery based on any of a variety of factors, such as requesting party, media type, and the like.

An example method of making media content available for delivery via a data communications network, according to the disclosure, includes receiving, via a communications interface, a request to make media content available for delivery, obtaining, via the communications interface, a media file having the media content, and determining a plurality of media profiles, based on the request. The plurality of media profiles includes a first set of media profiles, and a second set of media profiles. The method further includes transcoding, with a processing unit, the media file in accordance with the first set of media profiles, sending, via the communications interface, a notification that the media content is available for delivery using at least the first set of media profiles, and transcoding the media file in accordance with the second set of media profiles.

An example server for making media content available for delivery via a data communications network, according to the disclosure, includes a communications interface and a processing unit coupled with the communications interface. The processing unit is configured to perform functions including receiving, via the communications interface, a request to make media content available for delivery, obtaining, via the communications interface, a media file including the media content, and determining a plurality of media profiles, based on the request. The plurality of media profiles includes a first set of media profiles, and a second set of media profiles. The processing unit is further configured to perform functions including transcoding the media file in accordance with the first set of media profiles, sending, via the communications interface, a notification that the media file is available for delivery using at least the first set of media profiles, and transcoding the media file in accordance with the second set of media profiles.

An example non-transitory computer-readable medium having instructions imbedded thereon for making media content available for delivery via a data communications network, according to the disclosure, can include computer-readable medium including instructions for receiving a request to make media content available for delivery, obtaining a media file including the media content, and determining a plurality of media profiles, based on the request. The plurality of media profiles includes a first set of media profiles, and a second set of media profiles. The computer-readable medium can further include instructions for transcoding the media file in accordance with the first set of media profiles, sending a notification that the media file is available for delivery using at least the first set of media profiles, and transcoding the media file in accordance with the second set of media profiles.

Items and/or techniques described herein may provide one or more of the following capabilities, as well as other capabilities not mentioned. As opposed to a simple transcoding service that returns transcoded files, techniques provided herein can transcode and make files available for delivery, providing quick notification to a media provider when the media content is available for delivery using at least a critical set of available media profiles. This can greatly reduce the workload on the media provider. These and other embodiments, along with many of its advantages and features, are described in more detail in conjunction with the text below and attached figures.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The increased availability of media content over data communications networks such as the Internet has mirrored the increased bandwidth for these networks. Because media has recently taken a more prominent role in data communications, the distribution of media and the data associated with such distribution has become increasingly important, particularly to media content providers. As the rate at which media content is made available for delivery continues to increase, so too does the workload of media providers providing the media content.

Figure 1:
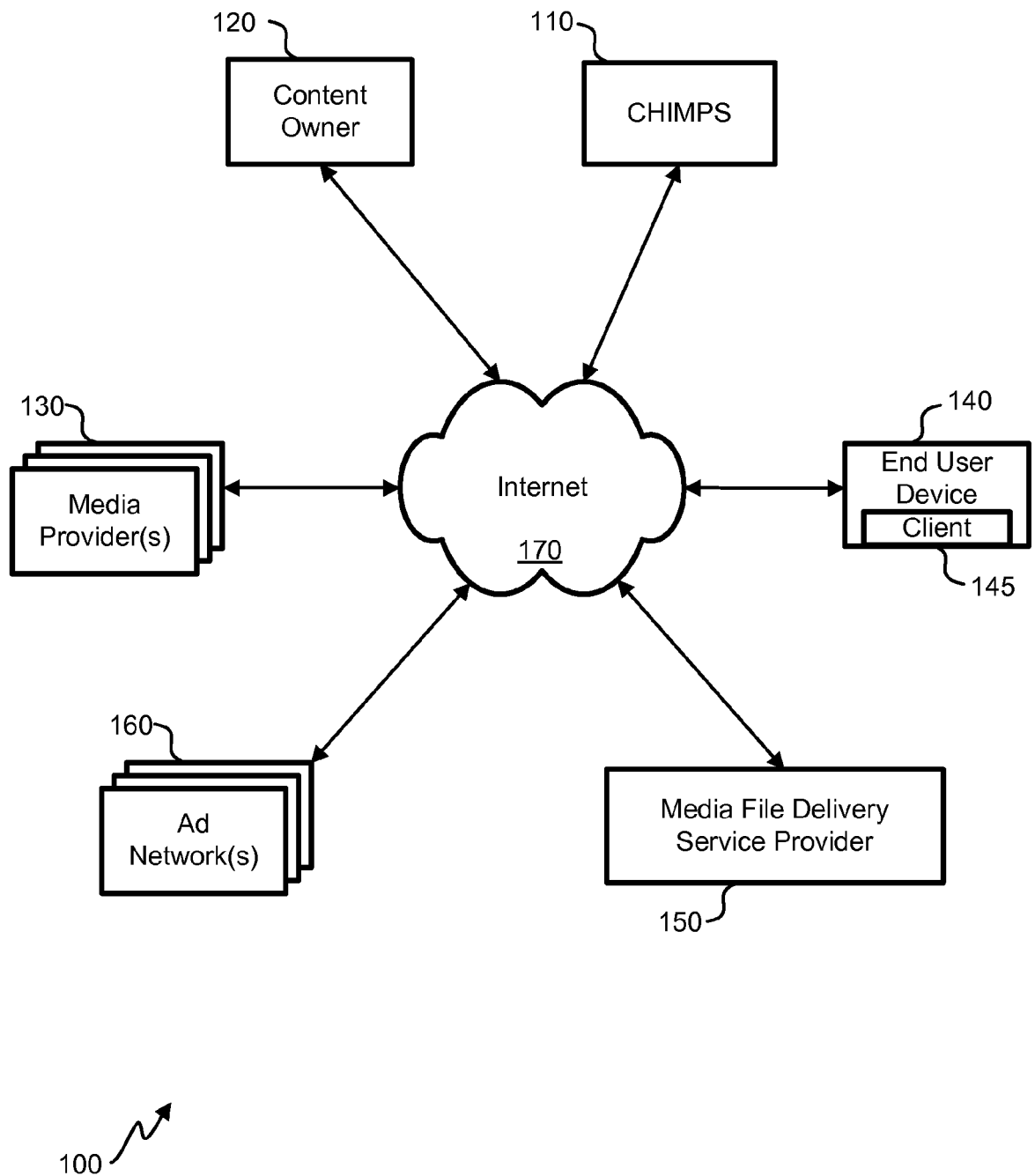
FIG. 1 is a block diagram illustrating a media servicing system, according to one embodiment of the present invention.

The distribution of media content via the Internet can involve a variety of entities. FIG. 1 is a block diagram illustrating a media servicing system 100, according to some embodiments of the present invention. The media servicing system 100 may deliver media content to a client 145, executed by an end user device 140 providing media playback to an end user. The client 145 can be, for example, a media player, browser, or other application adapted to request and/or play media files. The media content can be provided via a network such as the Internet 170 and/or other data communications networks, such as a distribution network for television content. The end user device 140 can be one of any number of devices configured to receive media over the Internet 170, such as a mobile phone, tablet, personal computer, portable media device, set-top box, video game console, etc. Although only one client 145 and one end user device 140 are shown in FIG. 1, it will be understood that the media servicing system 100 can provide media to many (hundreds, thousands, millions, etc.) of clients 145 on many (hundreds, thousands, millions, etc.) of end user devices 140.

A media file provided by one or more media providers 130 can be processed and indexed by cloud-hosted integrated multi-node pipelining system (CHIMPS) 110. The media file may be stored on media file delivery service provider (MFDSP) 150, such as a content delivery network, media streaming service provider, cloud data services provider, or other third-party media file delivery service provider. Additionally or alternatively, the CHIMPS 110 may also be adapted to store the media file.

The CHIMPS 110 can further manage the processing and syndication of media received from the media provider(s) 130. For example, the CHIMPS 110 can provide transcoding and other services, as describe in more detail below, to enable media provided by the media provider(s) to be distributed in a variety of formats to a variety of different device types in a variety of locations. Furthermore, the CHIMPS 110 provide feedback to the media provider(s) 130 regarding the media's syndication, including user behavior during media playback. For example, the CHIMPS 110 can provide a media provider 130 with information indicating that end users tend to stop watching a video at a certain point in playback, or that users tended to follow links associated with certain advertisements displayed during playback. With this data, media provider(s) 130 can adjust factors such as media content, advertisement placement and content, etc., to increase revenue associated with the media content and provide the end user device 140 with a more desirable playback experience.

Additionally or alternatively, the CHIMPS 110 can dynamically provide a customized playback experience on the end user device 140 according to aspects of the context associated with the content at the time of the request, aspects of the content request itself, or both. It can be noted that although embodiments herein may utilize media files explicitly, other embodiments may utilized other forms of media assets, such as live streams, or other forms of media, such as dynamic web pages, and may incorporate multiple media elements, including players, user interface components, user controls and control components, images, and other media content, objects, or types.

Additionally, it can be noted that various functions, operations, processes, or other aspects that are described in this and other examples, as being performed by or attributable to the CHIMPS 110 can be performed by another system operating in conjunction with the CHIMPS 110, loosely or tightly synchronized with the CHIMPS 110, or independently; for example, collecting data from other digital services to be combined and reported with data collected by the CHIMPS 110 can, in some implementations, be performed by a system other than the CHIMPS 110. Additional detail regarding the functionality of the CHIMPS 110 can be found in U.S. patent application Ser. No. 13/624,029, entitled "Dynamic Chunking for Delivery Instances," which is incorporated by reference herein in its entirety.

A content owner 120 can utilize one or more media provider(s) 130 to distribute media content owned by the content owner 120. For example, a content owner 120 could be a movie studio that licenses distribution of certain media through various media providers 130 such as television networks, Internet media streaming websites and other on-demand media providers, media conglomerates, and the like. In some configurations, the content owner 120 also can operate as a media provider 130.

The content owner 120 and/or media provider(s) 130 can enter into an agreement with one or more ad network(s) 160 to provide advertisements to numerous clients 145 on numerous end user devices 140. In this manner, the ad network(s) 160 allow companies to show advertisements to end users viewing the media content from the media provider(s) 130. Because ad network(s) 160 can maintain advertisements and/or advertisement data separate from media content, the advertisements can be updated and subject to business rules such that, two users viewing the same media content at different times and/or in different locations may see different advertisements.

Figure 2:
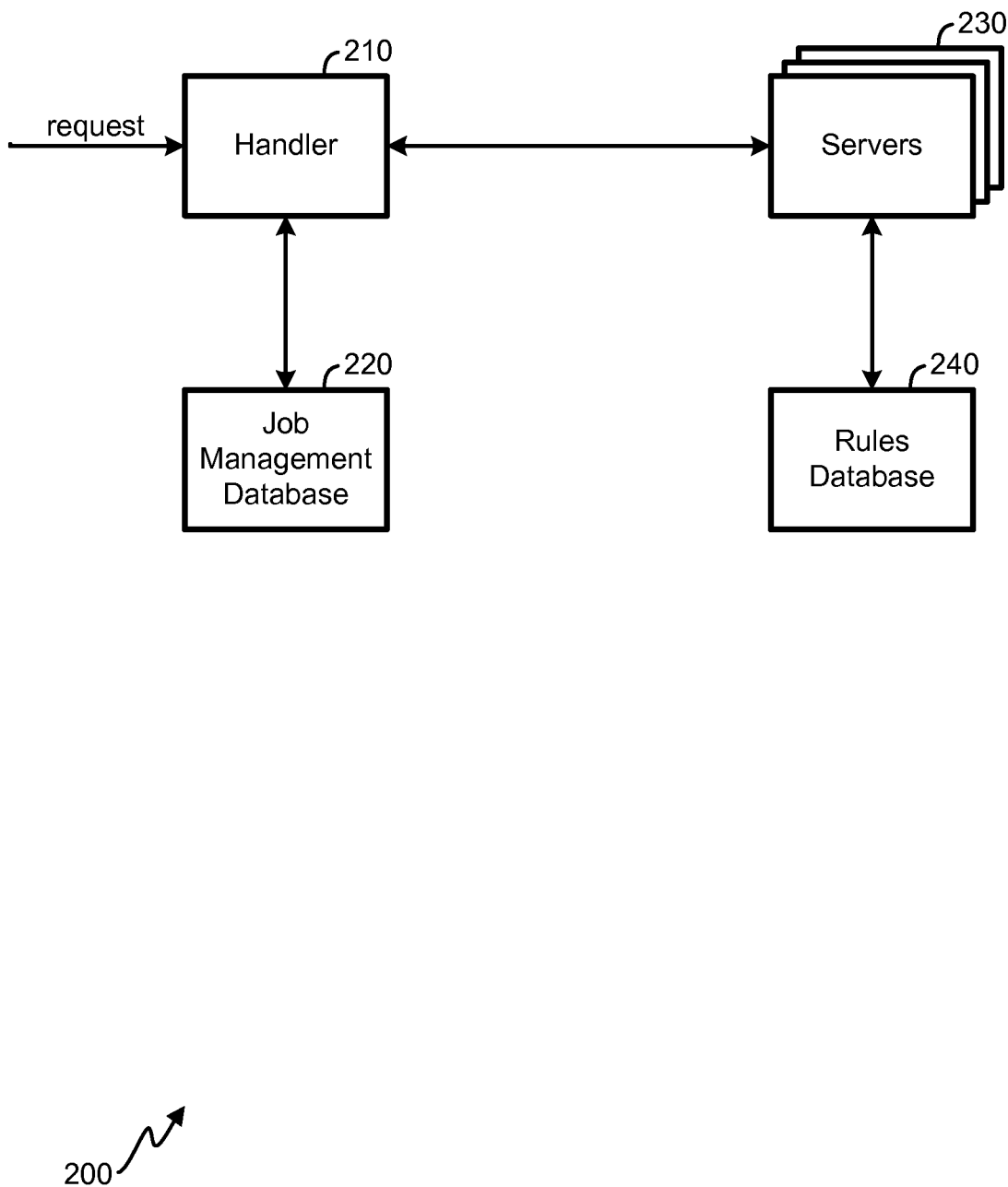
FIG. 2 is a simplified block diagram illustrating a cloud-based media delivery system 200, according to one embodiment.

Techniques provided herein provide cloud-based media delivery solutions that can reduce the workload on media provider(s) 130 to publish the media files. Rather than providing a transcoding service that returns media files to be published, techniques herein provide for transcoding and publishing media files for delivery, thereby reducing the workload on media provider(s) 130 to publish the media files. FIG. 2 is a simplified block diagram illustrating a cloud-based media delivery system 200, according to one embodiment. The cloud-based media delivery system 200 can comprise a handler 210, job management database 220, servers 230 for transcoding media files, and a rules database 240. The cloud-based media delivery system 200 can further be integrated into the media servicing system 100 of FIG. 1, as part of the CHIMPS 110 and/or MFDSP 150, for example.

The components illustrated in FIG. 2 functionally describe the cloud-based media delivery system 200. Accordingly, these components may be implemented in a variety of ways, such as software and/or hardware, which can be executed by and/or integrated into one or more computers (e.g., hardware servers), such as the computer system 600 of FIG. 6. Other embodiments may combine, separate, add, omit, substitute, and/or modify components of the cloud-based media delivery system 200, while providing the same overall functionality as described herein.

The handler 210 receives a request from a requesting entity, such as a media provider 130 desiring to make media content available for delivery to end user devices. The request can include information for processing the media content, such as information regarding the media content (e.g., title, length, description, etc.), publication rules (e.g., where and when the media file can be made available for delivery, etc.), and/or business logic. Depending on desired functionality, the request can further include a file that includes the media content (e.g., a media file) or a location, such as a URL, where such a file is available. The request can also provide information for providing a notification to the requesting entity (or another entity), such as a URL to which a notification can be posted, an email address, an Internet Protocol (IP) address/port number for providing a socket request, and the like.

The handler can then communicate with the job management database 220 to help manage transcoding and publishing of the media content among the servers 230. The job management database 220 can include information such as a list of available servers that can transcode media content related to the incoming request, the number of transcode jobs currently being executed by the servers 230, and the like. Based on the information provided by the job management database 220, the handler 210 can select one or more of the servers 230 to handle the request. This selection can also be informed by business rules, which can dictate how servers are selected based on media provider 130, media type, and more. For example, one or more servers 230 may be dedicated to handle requests from certain media providers 130. The handler 210 then provides the request to the selected server(s) 230.

The selected server(s) 230 then obtain the media file having the media content by ingesting the media file from a location specified in the request, or receiving the media file if uploaded with the request. The selected server(s) 230 can determine related business rules for a request in the rules database 240, which can indicate certain rules to follow, some or all of which may alternatively be provided in the request, depending on desired functionality. These rules can include publication rules, media profiles (e.g., descriptions of certain bit rates, resolutions, formats, audio tracks, etc. to use for transcoding), and the like. Information in the rules database 240 and/or the request may indicate which of the media profiles form a "critical set" to be made available at the time of delivery of the media content. (Additional detail regarding the critical set of media profiles is provided hereafter.) The selected server(s) 230 may also create a data object corresponding to the media item which can be provided to additional systems (not shown) for media management, analytics, and/or distribution purposes.

Figure 3:
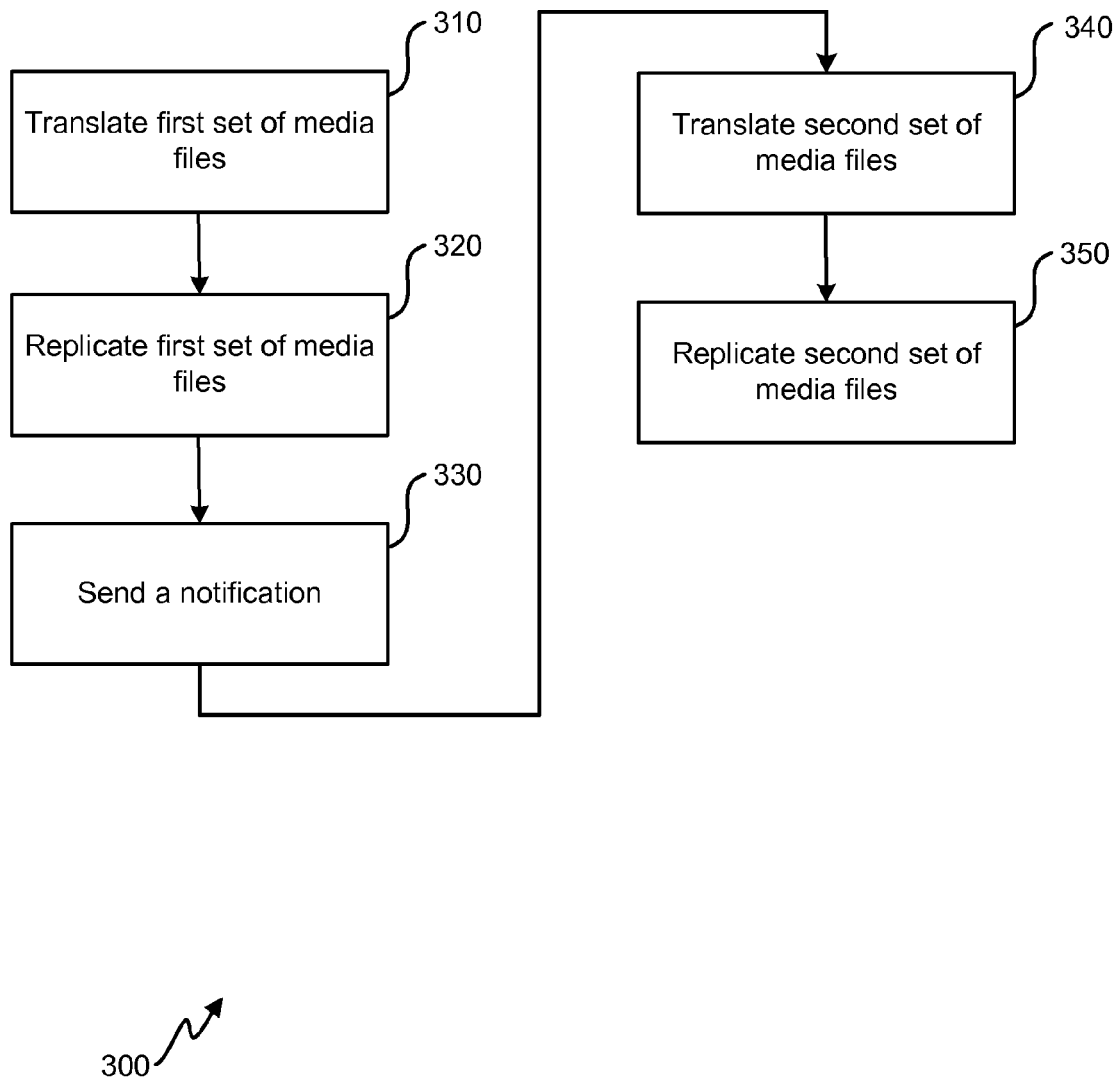
FIG. 3 is a flow diagram illustrating a generalized process for preparing media content for delivery, according to one embodiment.

Based on information provided in the request and/or rules database 240, the selected server(s) 230 will follow a process of transcoding, replicating, and notifying, such as the process 300 shown in FIG. 3. At block 310, the selected server(s) 230 transcode a first set media files that correspond to a first set of media profiles, which is a subset of all the media profiles according to which the media file will be transcoded. This first set of media profiles can represent a critical set of media profiles available at the time the media content is made available for delivery to end users. This critical set of media profiles can vary by media provider 130 or even request. As indicated above, information identifying the critical set can be included in the request and/or rules database 240.

At block 320, the first set of media files is replicated for media delivery. Referring to FIG. 1, for example, the media files may be propagated to edge servers of the MFDSP 150 and/or CHIMPS 110 for delivery to end users. Because such replication can involve multiple, distributed servers, replicating the first set of media files can involve sending the first set of media files from the selected server(s) 230 to other physical systems of a media delivery network for content delivery. In some embodiments, the other physical systems can indicate to the selected server(s) 230 when the media content is ready for delivery. Additionally or alternatively, the selected server(s) 230 can determine the availability of media content for delivery based on factors such as when the corresponding media files were sent to the other physical systems, calculations and/or historical data regarding the temporal relationship between when the media files are sent and when they are available for delivery, and the like.

The selected server(s) 230 then send a notification at block 330. The notification, which can be sent directly or indirectly to the requesting entity (e.g., media provider 130) or other entity, can include an indication that at least the first set of media files is available for delivery. The files can be provided at predetermined locations, or the locations (e.g., URLs) may be provided in the notification. In some embodiments, a single URL for all the media files can be provided, which can be used to redirect media requests to the appropriate media file for each request (based on a client 145, end user device 140, network conditions, and the like).

Blocks 340 and 350 echo blocks 310 and 320, but a second set of media files is transcoded and replicated. Here, the second set of media files can correspond to all remaining profiles, not included in the critical set, according to which media content is to be transcoded. Optionally, an additional notification can be sent (not shown) after the second set of media files is replicated, depending on desired functionality. In this manner, a media provider 130 (or other entity) can ensure that a user experience achieves at least a minimum threshold once the content is available using the critical media profiles. Subsequently, the user experience can improve further as additional media profiles are made available.

Figure 4:
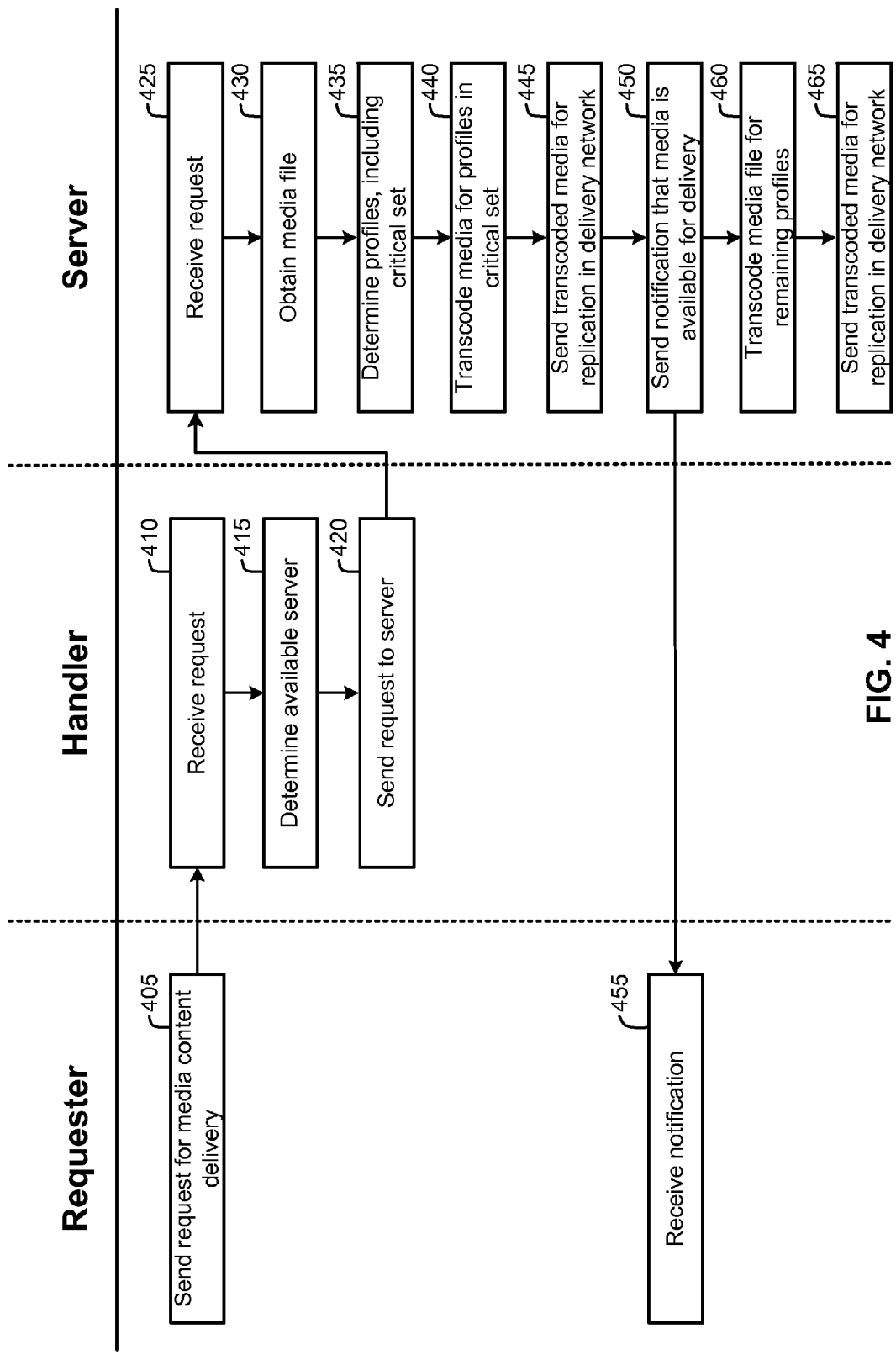
FIG. 4 is a swim-lane diagram illustrating how components described herein can interact to provide cloud-based media delivery, according to one embodiment.

FIG. 4 is a swim-lane diagram illustrating the interactions between a requester, handler, and transcoding server, according to one embodiment. As discussed earlier, the requester can be an entity, such as the content owner 120 and/or media provider 130 of FIG. 1, desiring to publish media content for delivery to end user devices. The handler can be an intake service of a transcoding or other media service provider. For example, the handler may be executed by a computer server hosted by the CHIMPS 110 and/or MFDSP 150 of FIG. 1. The server can be one of many servers available to perform transcoding and/or other processing functions. Again, the server may be hosted, for example, by the CHIMPS 110 and/or MFDSP 150 of FIG. 1. The requester, handler, and/or server may be implemented by one or more computer systems, such as the computer system 600 of FIG. 6.

At block 405 the requester sends a request for media content delivery to the handler, which is received by the handler at block 410. Depending on desired functionality, the request may include content and/or metadata including a media file having the media content, information regarding the media content, publication rules, business logic, information for providing a notification, and the like.

At block 415, the handler determines an available server to handle the request. As illustrated in FIG. 3, the handler may utilize a database or other mechanism to help determine which server(s) may be available to handle the request. Besides availability, business logic and other factors may be considered when routing the request to a server. Once the handler selects the server that will handle the request, the handler sends the request to the server, at block 420.

The server receives the request, at block 425, and obtains the media file at block 430. As stated previously, the media file can be uploaded by the requester and provided with the request. Alternatively, the server can retrieve the media file from a location, such as a server hosted by the requester. In this case, the location of the media file may be indicated in the request.

At block 435, the server determines profiles to use for transcoding the media file, and identifies the profiles that form the critical set of profiles to complete first. This determination can be informed by business rules or other logic included in the request, and/or may be stored in a rules database. The profiles and critical set may vary by content, requester, time of day, or any of a variety of other factors, depending on desired functionality.

At block 440, the media file is transcoded in accordance with the critical set of media profiles, then sent for replication in a media delivery network, at block 445. Depending on the type of media delivery network, the server may send the transcoded media to one or many different locations and/or servers for media delivery. The server then sends a notification that the media is available for delivery (using the critical set of media profiles), at block 450, which is received by the requester at block 455. In some embodiments, there may be an expected lag or delay from when the transcoded media profile is sent for replication and when it is available for delivery. In such embodiments, the notification can indicate when the media is expected to be available for delivery.

The way in which the notification is sent can vary depending on the desired implementation. As stated previously, the notification can be sent using information provided in the request (e.g., a notification URL), and/or information stored as business rules in a rules database accessible by the server. In some instances, "sending" the notification may simply include posting notification information to a URL. Thus, the notification may not be immediately received by the requester, and/or the notification may be received by one or more entities other than the requester. Furthermore, the content of the notification can vary. It can include, for example, data indicating the media content available, a time stamp, location(s) of the transcoded media content, and the like. The content of the notification can be based on business rules that pertain to the particular requester, media content, etc.

The server continues the process at block 460 by transcoding the media file in accordance with the remaining profiles (e.g., those media profiles not in the critical set of media profiles), and then the server sends the transcoded media for replication in the delivery network, at block 465. Optionally, the server can send another notification once the second round of transcoding and replication is completed. In other instances, there may be no need to do so because the remaining transcode times are easily calculable. In one embodiment for example the second round of transcoding takes approximately twice as long as the first round, so that, if it takes 15 seconds to make the critical profiles of the media content available for delivery, it is understood that the remaining media profiles will be available approximately 30 seconds thereafter.

As an illustrative example of the processes shown in FIGS. 3 and 4, a media provider X may request that a video clip showing a replay of a live sporting event is made available for delivery to end users. The request includes information indicating the media is to be available only in the United States, as well as a URL of the video clip (stored on a server of media provider X), and a notification URL. The request is received by a handler, which uses information from a job management database to select server Y, one of a plurality of transcoding servers, to process the request. The handler then forwards the request to server Y, which accesses a rules database to determine which media profiles to use in transcoding. The rules database indicates that, for media provider X, "critical" media profiles include a low-quality mobile profile, a medium-quality mobile profile, an audio-only profile, and a low-quality browser profile. The rules database indicates that additional profiles for media provider X include a variety of higher-quality mobile and browser profiles. Server Y then transcodes the video clip into a first set of media files corresponding to the critical media profiles and sends the media files to media delivery servers to make the media files available for streaming and/or download to end users. Server Y then posts a notification to the notification URL provided in the request, indicating the critical profiles for the video clip have been transcoded and are available for delivery to end users at a particular URL. Server Y then continues to transcode the video clip in accordance with the remaining, higher quality profiles, resulting in a second set of media files which are sent to the media delivery servers.

Of course, it will be understood that embodiments can carry out the process for media delivery in different ways. As indicated herein above, each of the components of a system for carrying out the processes described herein can implement different business rules to provide requests, notification, and other functionality that comports with the preferences of media provider(s) 130, content owners 120, and/or other requesting entities. Furthermore, notification can vary such that multiple notifications are sent at various stages of during transcoding and replication. Alternatively, a single notification may be sent at the completion of transcoding and replication for all media profiles. A person of ordinary skill in the art will recognize many omissions, substitutions, and/or other modifications of the processes described herein.

Figure 5:
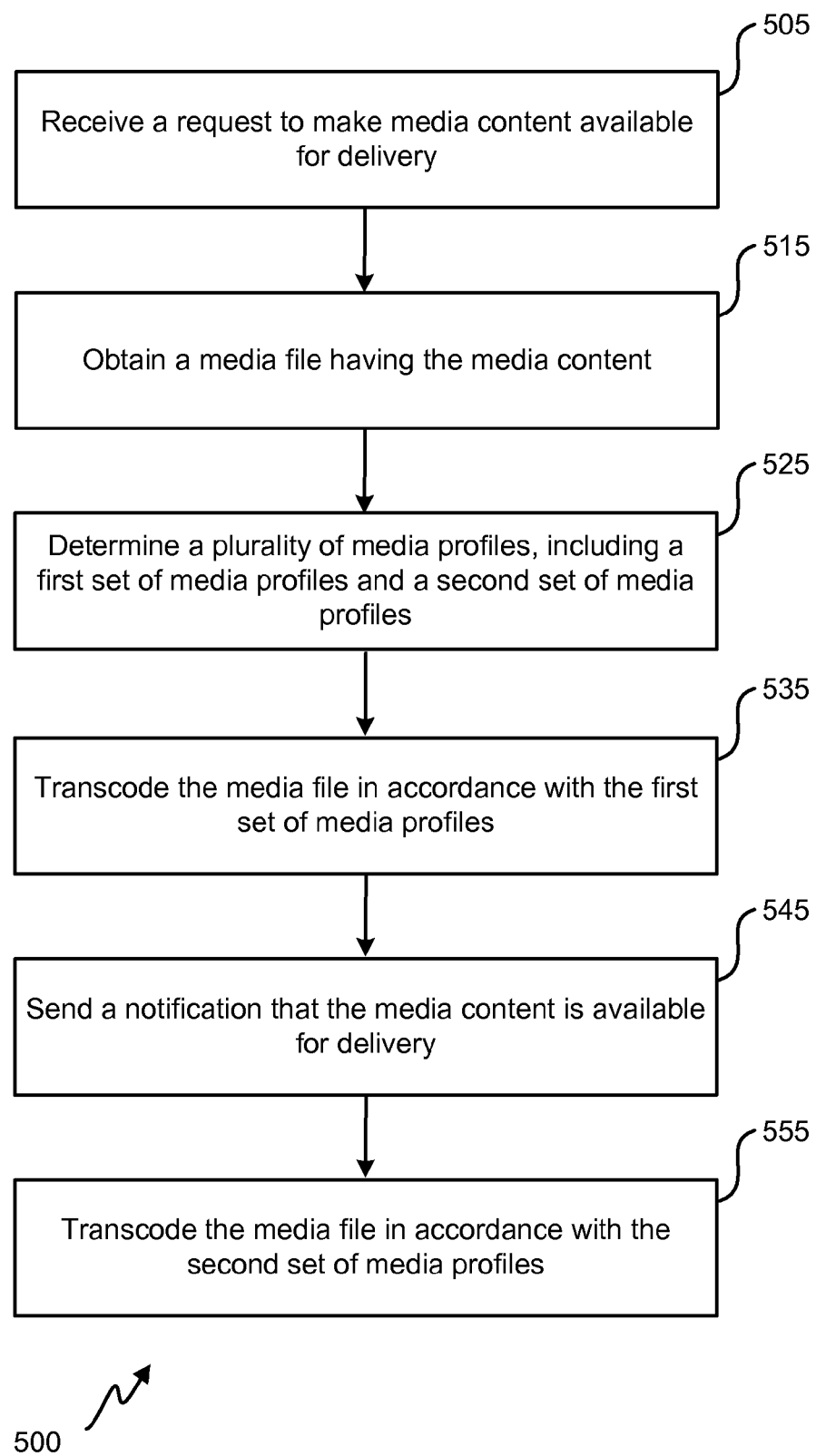
FIG. 5 is a simplified flow chart illustrating an embodiment of a process of providing cloud-based media delivery.

FIG. 5 is a simplified flow chart illustrating a method 500 of providing cloud-based media delivery, according to one embodiment. The method 500 can be seen as a generic implementation of one or more of the processes described in relation to FIGS. 2-4. Accordingly, method 500 may be implemented, for example, by a server and or other components of the systems described in relation to FIGS. 2-4. As with all other figures provided herein, FIG. 5 is provided as an example and is not limiting. Various blocks may be combined, separated, and/or otherwise modified, depending on desired functionality. Furthermore, different blocks may be executed by different components of a system and/or different systems. Such systems can include the computer system, described herein below with regard to FIG. 6.

At block 505, a request to make media content available for delivery is received. The request can come from a requesting entity, such as a media provider or content owner, and may be further routed by a handler as described herein above. The media content can include virtually any type of media, such as audio and/or video content. At block 515, the media file that has the media content is obtained. As explained previously, the media file can be included with and/or in the request, or may be retrieved separately. In the latter case, the request may include information indicative of a location from which the media file may be retrieved.

At block 525, a plurality of media profiles is determined, which includes a first set of media profiles and a second set of media profiles. The first set of media profiles can be seen as a critical set of the media profiles to be made available at the time the media content is initially made available for consumption by end users, whereas the second set of media profiles may simply include the remaining profiles in the plurality of media profiles not included in the first set of media profiles. As indicated elsewhere herein, media profiles can determine how a media file is transcoded, determining, for example, various characteristics of the media content (format, resolution, bit rate, etc.). Different profiles may accommodate playback on different end-user devices, clients, and/or network conditions.

The plurality of media profiles, the first set of media profiles, and/or the second set of media profiles may be determines by using business rules related to the requesting entity and/or information provided in the request. In some embodiments, for example, the request may indicate the plurality of profiles to use for media content delivery, and which, of those profiles, should be included in the first set.

The media file is then transcoded in accordance with the first set of media profiles, at block 535. The resulting set of media files can then be sent for replication throughout a media delivery network, and/or other steps can be taken to ensure the media is made available for delivery. At block 545, a notification is sent, indicating that the media content is available for delivery. In some embodiments, the notification may be sent based on notification information provided in the request, thereby allowing a requesting entity to determine, for each media item, how it would like to receive the notification. This notification information can comprise a URL, email, IP address, and the like.

Finally, at block 555, the media file is transcoded in accordance with the second set of media profiles.

It should be noted that FIG. 5 provides only an example method 500 of providing cloud-based media delivery. Other embodiments may omit, substitute, or add various procedures or components as appropriate. Furthermore, inasmuch as method 500 can be cloud-based, one or more of the components of the method 500 can include communicating with one or more networked computers via a data communication network using a communications interface. A person of ordinary skill in the art will recognize many alterations to the example method 500 of FIG. 5.

Furthermore, although the techniques described herein discuss providing notifications regarding transcoding for media content delivery, they can be easily extended to other services, such as fee computation or any other cloud-based computation task that involves notifying a media provider or other entity that media or data is available. Furthermore, although techniques described herein are often provided in the context of video delivery, they can be applied to other forms of media content as well. A person of ordinary skill in the art will recognize many alternate applications.

Figure 6:
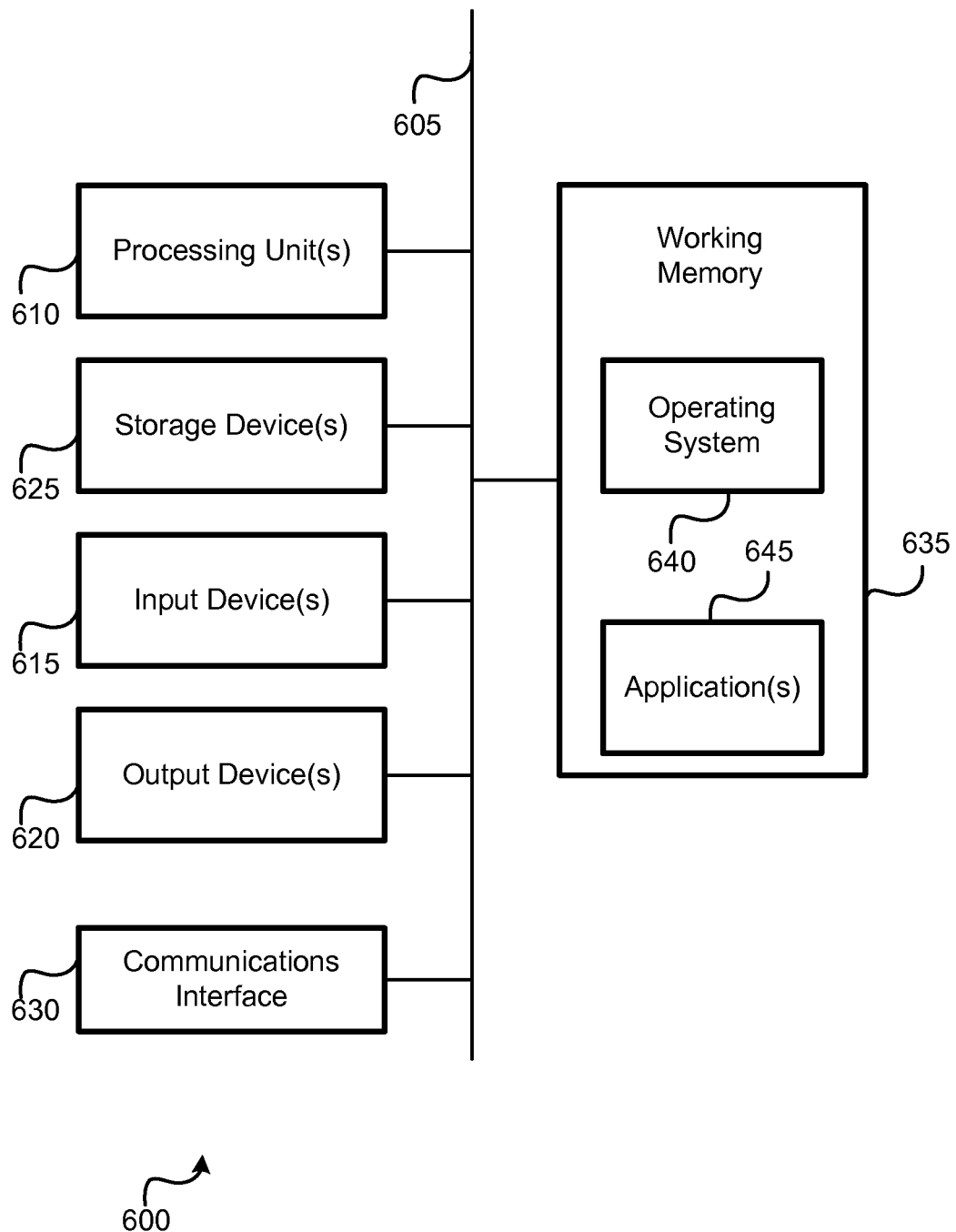
FIG. 6 is a block diagram of an embodiment of a computer system.

FIG. 6 illustrates an embodiment of a computer system 600, which may be configured to execute various components described herein using any combination of hardware and/or software. For example, one or more computer systems 600 can be configured to execute the CHIMPS 110, handler 210, servers 230, and/or other components of the systems described in relation to FIGS. 1-4. FIG. 6 provides a schematic illustration of one embodiment of a computer system 600 that can perform the methods provided by various other embodiments, such as the methods described in relation to FIGS. 4-5. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. In addition, it can be noted that components illustrated by FIG. 6 can be localized to a single device and/or distributed among various networked devices, which may be disposed at different physical locations.

The computer system 600 is shown comprising hardware elements that can be electrically coupled via a bus 605 (or may otherwise be in communication, as appropriate). The hardware elements may include processing unit(s) 610, which can include without limitation one or more general-purpose processors, one or more special-purpose processors (such as digital signal processors, graphics acceleration processors, and/or the like), and/or other processing structure, which can be configured to perform one or more of the methods described herein, including the methods described in relation to FIGS. 4-5, by, for example, executing commands stored in a memory. The computer system 600 also can include one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage. This can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 can also include a communications interface 630, which can include wireless and wired communication technologies. Accordingly, the communications interface can include a modem, a network card (wireless or wired), an infrared communication device, a wireless communication device, and/or a chipset (such as a Bluetooth™ device, an IEEE 602.11 device, an IEEE 602.15.4 device, a WiFi device, a WiMax device, cellular communication facilities, UWB interface, etc.), and/or the like. The communications interface 630 can therefore permit the computer system 600 to be exchanged with other devices and components of a network.

In many embodiments, the computer system 600 will further comprise a working memory 635, which can include a RAM or ROM device, as described above. Software elements, shown as being located within the working memory 635, can include an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 4-5, might be implemented as code and/or instructions executable by a computer (and/or a processing unit within a computer); in an aspect, then, such code and/or instructions can be used to configure and/or adapt a general purpose computer, processing unit, and/or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processing unit(s) 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit(s) 610 to perform one or more procedures of the methods described herein. Additionally or alternatively, portions of the methods described herein may be executed through specialized hardware.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of making media content available for delivery via a data communications network, the method comprising:
   receiving, via a communications interface, a request to make media content available for delivery;
   obtaining, via the communications interface, a media file having the media content;
   determining a plurality of media profiles, based on the request, wherein:
      each media profile of the plurality of media profiles determines a manner in which the media content is transcoded; and
      the plurality of media profiles includes:
         a first set of media profiles, and
         a second set of media profiles different from the first set of media profiles;
         wherein each of the first set of media profiles and the second set of media profiles comprises two or more media profiles;
   transcoding, with a processing unit, the media file in accordance with the first set of media profiles to produce a first set of two or more output media files;
   subsequent to producing the first set of two or more output media files, sending, via the communications interface, a notification that the media content is available for delivery using at least the first set of media profiles, based on a determination that the media file has been transcoded in accordance with the first set of media profiles; and
   subsequent to sending the notification, transcoding the media file in accordance with the second set of media profiles to produce a second set of two or more output media files.

2. The method of making media content available for delivery via a data communications network as recited in claim 1, wherein the media content comprises a video.

3. The method of making media content available for delivery via a data communications network as recited in claim 1, wherein obtaining the media file associated with the media content comprises receiving the media file with the request.

4. The method of making media content available for delivery via a data communications network as recited in claim 1, wherein:
   the request includes information indicative of a location of the media file; and
   obtaining the media file associated with the media content comprises retrieving the media file using the information indicative of the location of the media file.

5. The method of making media content available for delivery via a data communications network as recited in claim 1, wherein:
   the request includes notification information; and
   sending the notification comprises sending the notification based on the notification information.

6. The method of making media content available for delivery via a data communications network as recited in claim 5, wherein the notification information comprises at least one of:
   a Uniform Resource Locator (URL),
   an email, or
   an Internet Protocol (IP) address.

7. The method of making media content available for delivery via a data communications network as recited in claim 1, further including determining, from the plurality of media profiles, the first set of media profiles.

8. The method of making media content available for delivery via a data communications network as recited in claim 7, wherein the determination of the first set of media profiles is based on information received in the request.

9. A server for making media content available for delivery via a data communications network, the server comprising:
a communications interface; and
a processing unit coupled with the communications interface and configured to perform functions including:
receiving, via the communications interface, a request to make media content available for delivery;
obtaining, via the communications interface, a media file including the media content;
determining a plurality of media profiles, based on the request, wherein the plurality of media profiles includes:
each media profile of the plurality of media profiles determines a manner in which the media content is transcoded; and
a first set of media profiles, and
a second set of media profiles different from the first set of media profiles;
wherein each of the first set of media profiles and the second set of media profiles comprises two or more media profiles;
transcoding the media file in accordance with the first set of media profiles to produce a first set of two or more output media files;
subsequent to producing the first set of two or more output media files, sending, via the communications interface, a notification that the media file is available for delivery using at least the first set of media profiles, based on a determination that the media file has been transcoded in accordance with the first set of media profiles; and
subsequent to sending the notification, transcoding the media file in accordance with the second set of media profiles to produce a second set of two or more output media files.

10. The server for making media content available for delivery via a data communications network as recited in claim 9, wherein the processing unit is configured to obtain the media file associated with the media content by receiving the media file with the request.

11. The server for making media content available for delivery via a data communications network as recited in claim 9, wherein the processing unit is configured to:
identify, in the request, information indicative of a location of the media file; and
obtain the media file associated with the media content by retrieving the media file using the information indicative of the location of the media file.

12. The server for making media content available for delivery via a data communications network as recited in claim 9, wherein the processing unit is configured to:
identify, in the request, notification information; and
send the notification based on the notification information.

13. The server for making media content available for delivery via a data communications network as recited in claim 9, wherein the processing unit is further configured to determine, from the plurality of media profiles, the first set of media profiles.

14. The server for making media content available for delivery via a data communications network as recited in claim 13, wherein the processing unit is further configured to base the determination of the first set of media profiles on information received in the request.

15. A non-transitory computer-readable medium having instructions imbedded thereon for making media content available for delivery via a data communications network, the computer-readable medium including instructions for:
receiving a request to make media content available for delivery;
obtaining a media file including the media content;
determining a plurality of media profiles, based on the request, wherein:
each media profile of the plurality of media profiles determines a manner in which the media content is transcoded; and
the plurality of media profiles includes:
a first set of media profiles, and
a second set of media profiles different from the first set of media profiles;
wherein each of the first set of media profiles and the second set of media profiles comprises two or more media profiles;
transcoding the media file in accordance with the first set of media profiles to produce a first set of two or more output media files;
subsequent to producing the first set of two or more output media files, sending a notification that the media file is available for delivery using at least the first set of media profiles, based on a determination that the media file has been transcoded in accordance with the first set of media profiles; and
subsequent to sending the notification, transcoding the media file in accordance with the second set of media profiles to produce a second set of two or more output media files.

16. The non-transitory computer-readable medium recited in claim 15, wherein the instructions for obtaining the media file associated with the media content comprise instructions for receiving the media file with the request.

17. The non-transitory computer-readable medium recited in claim 15, wherein:
the instructions include instructions for identifying, in the request, information indicative of a location of the media file; and
the instructions for obtaining the media file associated with the media content comprise instructions for retrieving the media file using the information indicative of the location of the media file.

18. The non-transitory computer-readable medium recited in claim 15, wherein:
the instructions include instructions for identifying, in the request, notification information; and
the instructions for sending the notification comprise instructions for sending the notification based on the notification information.

19. The non-transitory computer-readable medium recited in claim 15, further including instructions for determining, from the plurality of media profiles, the first set of media profiles.

20. The non-transitory computer-readable medium recited in claim 19, wherein the instructions for determining include instructions for basing the determination of the first set of media profiles on information received in the request.

* * * * *